US012746822B2

(12) United States Patent
Ranjbar

(10) Patent No.: US 12,746,822 B2
(45) Date of Patent: Sep. 29, 2026

(54) REAL TIME LIFE-TIME MONITORING IN ELECTRIC VEHICLE POWERTRAINS

(71) Applicant: Canoo Technologies Inc., Torrance, CA (US)

(72) Inventor: Amir Ranjbar, Commerce Township, MI (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 154 days.

(21) Appl. No.: 18/924,548

(22) Filed: Oct. 23, 2024

(65) Prior Publication Data

US 2026/0109233 A1 Apr. 23, 2026

(51) Int. Cl.
*B60L 3/00* (2019.01)
*B60L 58/20* (2019.01)

(52) U.S. Cl.
CPC ............. *B60L 3/0023* (2013.01); *B60L 58/20* (2019.02); *B60L 2210/10* (2013.01)

(58) Field of Classification Search
CPC .... B60L 3/0023; B60L 58/20; B60L 2210/10; B60L 3/12; B60L 58/16
See application file for complete search history.

(56) References Cited

U.S. PATENT DOCUMENTS

| | | | | |
|---|---|---|---|---|
| 11,145,141 | B2 * | 10/2021 | Diamond .......... | B60W 50/0097 |
| 2023/0211699 | A1 * | 7/2023 | Lee ......................... | B60L 58/12 701/22 |
| 2025/0042298 | A1 * | 2/2025 | Cregut ................ | H01M 10/482 |

OTHER PUBLICATIONS

Abdi, et al., "Reliability Calculation of DC-DC Converters and Determination of Optimum Topology Compliant with Fuel Cell Application," 2007 7th International Conference on Power Electronics and Drive Systems (PEDS 2007), Nov. 27-30, 2007, Bangkok, Thailand, pp. 32-37.

Ranjbar, et al., "Effect of Paralleling Switches on Reduction of Reliability of Fuel Cell DC-DC Converters," 2008 Twenty-Third Annual IEEE Applied Power Electronics Conference and Exposition, Austin, Texas, Feb. 24-28, 2008, pp. 304-308.

Abdi, et al., "Reliability Comparison of Boost PFC Converter in DCM and CCM Operating Modes," 2008 International Symposium on Power Electronics, Electrical Drives, Automation and Motion (SPEEDAM 2008), Ischia, Italy, Jun. 11-13, 2008, pp. 939-943.

(Continued)

*Primary Examiner* — Giovanni Astacio-Oquendo

(74) *Attorney, Agent, or Firm* — ALLEN, DYER, DOPPELT, + GILCHRIST, P.A.

(57) ABSTRACT

A method includes receiving, by a processing device of a vehicle, one or more measurements related to a component of the vehicle. The method also includes determining, by the processing device, based on the one or more measurements, a failure rate and a mean time to failure (MTTF) for the vehicle component. The method also includes transmitting, by the processing device using a communication interface, the failure rate and the MTTF to one or more destination systems. The method also includes implementing, by the processing device based on a determination of a failure rate increase for the vehicle component, one or more actions to increase an operation lifetime of the vehicle component.

22 Claims, 9 Drawing Sheets

(56) References Cited

OTHER PUBLICATIONS

Ranjbar, et al., "Reliability Considerations for Full-Bridge DC-DC Converter in Fuel-Cell Applications," 2008 International Symposium on Power Electronics, Electrical Drives, Automation and Motion (SPEEDAM 2008), Ischia, Italy, Jun. 11-13, 2008, pp. 810-814.
Abdi, et al., "Reliability Considerations for Parallel Performance of Semiconductor Switches in High-Power Switching Power Supplies," IEEE Transactions on Industrial Electronics, vol. 56, No. 6, Jun. 2009, pp. 2133-2139.
Ranjbar, et al., "Helpful Hints to Enhance Reliability of DC-DC Converters in Hybrid Electric Vehicle Applications," 2010 IEEE Vehicle Power and Propulsion Conference, Lille, France, Sep. 1-3, 2010, 6 pages.

* cited by examiner

REAL TIME LIFE-TIME MONITORING IN ELECTRIC VEHICLE POWERTRAINS

TECHNICAL FIELD

This disclosure relates generally to automotive vehicle systems. More specifically, this disclosure relates to real time life-time monitoring in electric vehicle powertrains.

BACKGROUND

Electric vehicle (EV) powertrain architectures tend to be simpler than internal combustion engine (ICE) counterparts. For example, the number of rotating components in an EV powertrain is typically significantly lower than in an ICE powertrain. This results in less required maintenance for EV powertrains as compared with their ICE counterparts. EV powertrain parts, however, when they fail, typically result in a higher repair and/or replacement costs. Additionally, the unique electrified powertrain components used by each automaker can make finding aftermarket parts difficult.

Also, due to the innovative nature of the EV powertrain components, they are not typically easily repairable by dealerships and/or mechanical shops. Therefore, in case of powertrain component failures, the respective parts must be replaced rather than repaired. The replacement cost is normally high when it comes to EV powertrain components. When there is a powertrain issue and the EV is taken to the shop for repair, the time spent for diagnostics can be high as there may not be visual evidence for the failure.

SUMMARY

This disclosure relates to a real time life-time monitoring in electric vehicle powertrains.

In one example, a method includes receiving, by a processing device of a vehicle, one or more measurements related to a vehicle component of the vehicle. The method also includes determining, by the processing device, based on the one or more measurements, a failure rate and a mean time to failure (MTTF) for the vehicle component. The method also includes transmitting, by the processing device using a communication interface, the failure rate and the MTTF to one or more destination systems. The method also includes implementing, by the processing device based on a determination of a failure rate increase for the vehicle component, one or more actions to increase an operation lifetime of the vehicle component.

In one or more of the above examples, the one or more measurements include one or more of a temperature of the vehicle component, a voltage of the vehicle component, or an electrical current of the vehicle component.

In one or more of the above examples, the method further includes determining, by the processing device, a failure rate and an MTTF for each of a plurality of vehicle components, and calculating, by the processing device, a total failure rate associated with the vehicle based on the failure rate and the MTTF determined for each of the vehicle components.

In one or more of the above examples, the one or more destination systems includes an infotainment system of the vehicle or a client electronic device, and wherein information associated with the failure rate and the MTTF is displayed on a screen of the infotainment system or the client electronic device.

In one or more of the above examples, the one or more destination systems includes a cloud system remote from the vehicle, and the method further includes receiving, by the processing device using the communication interface, a software update transmitted from the cloud system, wherein the software update includes changes to one or more operating parameters of the vehicle related to the one or more actions to increase the operation lifetime of the vehicle component.

In one or more of the above examples, the vehicle component includes a high-voltage battery and an associated battery management system (BMS), a low-voltage battery, a direct current (DC)-DC converter, an onboard charger, a traction inverter, or one or more electric motors.

In one or more of the above examples, the vehicle component is the onboard charger, and wherein implementing, by the processing device based on the determination of the failure rate increase for the vehicle component, the one or more actions includes reducing a maximum level 2 charging power of the onboard charger, or disabling level 2 charging and only allowing level 3 DC fast charging.

In one or more of the above examples, the vehicle component is the one or more electric motors and the one or more electric motors includes only one electric motor, and wherein implementing, by the processing device based on the determination of the failure rate increase for the vehicle component, the one or more actions includes derating power to the one electric motor.

In one or more of the above examples, the vehicle component is the one or more electric motors and the one or more electric motors includes a first electric motor and a second electric motor, and wherein implementing, by the processing device based on the determination of the failure rate increase for the vehicle component, the one or more actions includes, based on an amount of the failure rate increase, determining that the first electric motor is associated with the failure rate increase, and reducing power provided to the first electric motor and increasing power to the second electric motor, or disabling the first electric motor.

In one or more of the above examples, the vehicle component is the DC-DC converter, and wherein implementing, by the processing device based on the determination of the failure rate increase for the vehicle component, the one or more actions includes disabling at least one non-critical accessory load on the DC-DC converter.

In one or more of the above examples, the vehicle component is the high-voltage battery, and wherein implementing, by the processing device based on the determination of the failure rate increase for the vehicle component, the one or more actions includes, based on an amount of the failure rate increase, derating a discharge power of the high-voltage battery, or enabling a limp mode function of the vehicle.

In another example, an electric vehicle includes a memory, a communication interface, and a processing device communicatively connected to the memory, the communication interface, and a vehicle component of the electric vehicle. The processing device is configured to receive one or more measurements related to the vehicle component. The processing device is also configured to determine, based on the one or more measurements, a failure rate and a MTTF for the vehicle component. The processing device is also configured to transmit, using the communication interface, the failure rate and the MTTF to one or more destination systems. The processing device is also configured to implement, based on a determination of a failure rate increase for the vehicle component, one or more actions to increase an operation lifetime of the vehicle component.

In one or more of the above examples, the one or more measurements include one or more of a temperature of the vehicle component, a voltage of the vehicle component, or an electrical current of the vehicle component.

In one or more of the above examples, the processing device is configured to determine a failure rate and an MTTF for each of a plurality of vehicle components, and calculate a total failure rate associated with the electric vehicle based on the failure rate and the MTTF determined for each of the vehicle components.

In one or more of the above examples, the one or more destination systems includes an infotainment system of the electric vehicle or a client electronic device, and wherein information associated with the failure rate and the MTTF is displayed on a screen of the infotainment system or the client electronic device.

In one or more of the above examples, the one or more destination systems includes a cloud system remote from the electric vehicle, wherein the processing device is configured to receive, using the communication interface, a software update transmitted from the cloud system, wherein the software update includes changes to one or more operating parameters of the electric vehicle related to the one or more actions to increase the operation lifetime of the vehicle component.

In one or more of the above examples, the vehicle component includes a high-voltage battery and an associated BMS, a low-voltage battery, a DC-DC converter, an onboard charger, a traction inverter, or one or more electric motors.

In one or more of the above examples, the vehicle component is the onboard charger, and wherein, to implement, based on the determination of the failure rate increase for the vehicle component, the one or more actions, the processing device is configured to reduce a maximum level 2 charging power of the onboard charger, or disable level 2 charging and only allow level 3 DC fast charging.

In one or more of the above examples, the vehicle component is the one or more electric motors and the one or more electric motors includes only one electric motor, and wherein, to implement, based on the determination of the failure rate increase for the vehicle component, the one or more actions, the processing device is configured to derate power to the one electric motor.

In one or more of the above examples, the vehicle component is the one or more electric motors and the one or more electric motors includes a first electric motor and a second electric motor, and wherein, to implement, based on the determination of the failure rate increase for the vehicle component, the one or more actions, the processing device is configured to, based on an amount of the failure rate increase, determine that the first electric motor is associated with the failure rate increase and reduce power provided to the first electric motor and increase power to the second electric motor, or disable the first electric motor.

In one or more of the above examples, the vehicle component is the DC-DC converter, and wherein, to implement, based on the determination of the failure rate increase for the vehicle component, the one or more actions, the processing device is configured to disable at least one non-critical accessory load on the DC-DC converter.

In one or more of the above examples, the vehicle component is the high-voltage battery, and wherein, to implement, based on the determination of the failure rate increase for the vehicle component, the one or more actions, the processing device is configured to, based on an amount of the failure rate increase, derate a discharge power of the high-voltage battery, or enable a limp mode function of the electric vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, electric vehicle (EV) powertrain architectures tend to be simpler than internal combustion engine (ICE) counterparts. For example, the number of rotating components in an EV powertrain is typically significantly lower than in an ICE powertrain. This results in less required maintenance for EV powertrains as compared with their ICE counterparts. EV powertrain parts, however, when they fail, typically result in a higher repair and/or replacement costs. Additionally, the unique electrified powertrain components used by each automaker can make finding aftermarket parts difficult. Also, due to the innovative nature of the EV powertrain components, they are not typically easily repairable by dealerships and/or mechanical shops. Therefore, in case of powertrain component failures, the respective parts must be replaced rather than repaired. The replacement cost is normally high when it comes to EV powertrain components. When there is a powertrain issue and the EV is taken to the shop for repair, the time spent for diagnostics can be high as there may not be visual evidence for the failure.

Therefore, it is critical to monitor the health of the EV powertrain system and determine the required maintenance before failures occur. Having access to the system health information can also help reduce the root cause analysis and diagnostic time at the service shop when failures occur. This invention thus provides systems and methods for real time life-time monitoring of electrified powertrain systems. Embodiments of this disclosure include calculating the failure rates and consequently the remaining life of powertrain systems and providing critical information needed to diagnose the issue when powertrain failures occur. Embodiments of this disclosure also include implementing proactive maintenance actions before failures occur.

Figure 1:
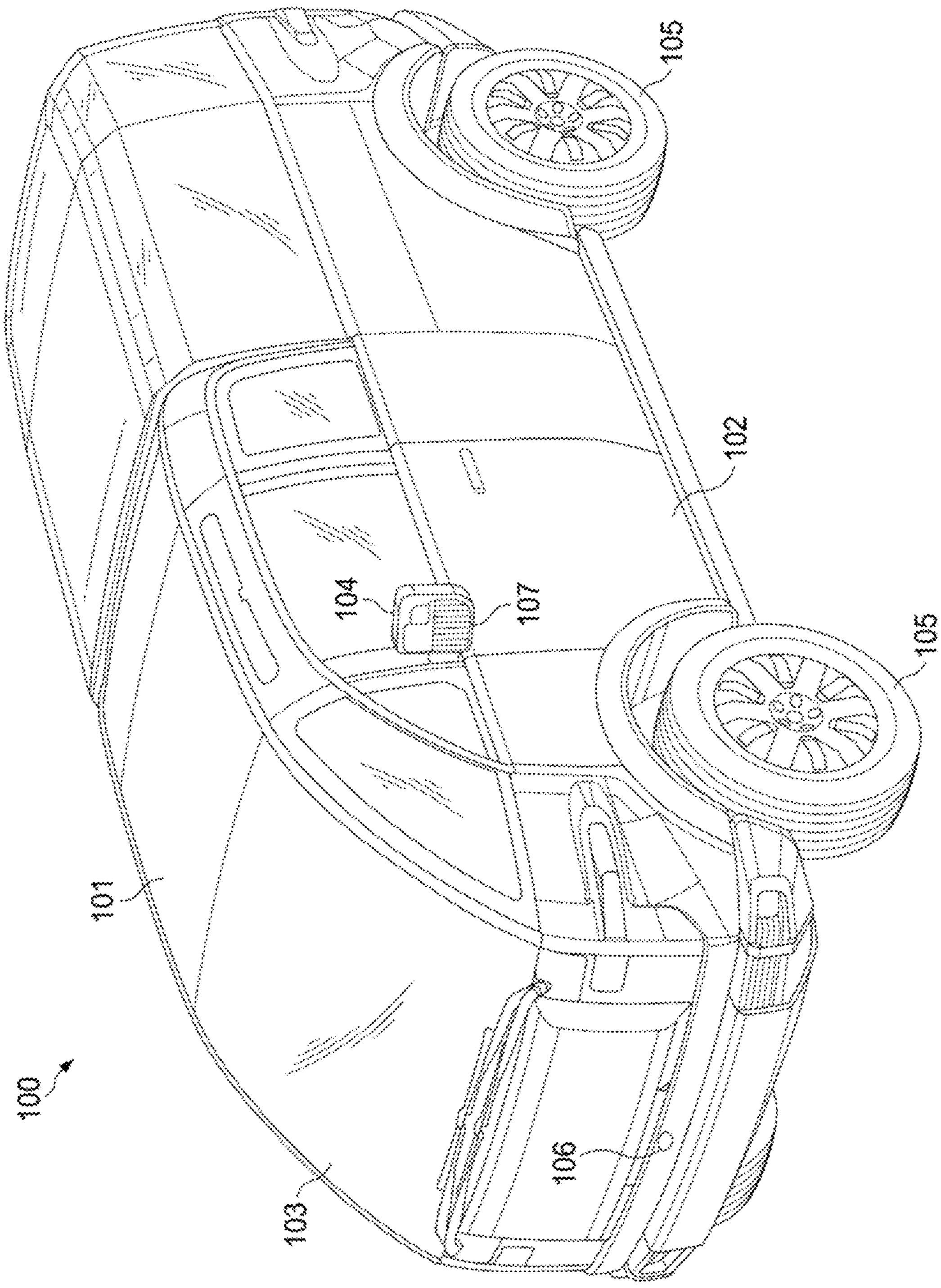
FIG. 1 is a perspective view of a vehicle with which real time life-time monitoring in electric vehicle powertrains is implemented in accordance with this disclosure.

FIG. 1 is a perspective view of a vehicle 100 with which real time life-time monitoring in electric vehicle powertrains is implemented in accordance with this disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an automated driving (AD) mode) to see outside the cabin 101. Rear view mirrors 104 mounted to sides of the cabin 101 enable the operator to see objects to the sides and rear of the cabin 101 and may include warning indicators (e.g., selectively illuminated warning lights) for advanced driver-assistance system (ADAS) features, such as blind spot warning (indicating that another vehicle is in the operator's blind spot) and/or lane departure warning features. Side cameras 107 may also be included on or near the rear view mirrors 104. At least one front camera 106 may also be included.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not shown). Automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the real time life-time monitoring for electric vehicle powertrains described in this disclosure may be used with any other suitable vehicle.

Figure 2:
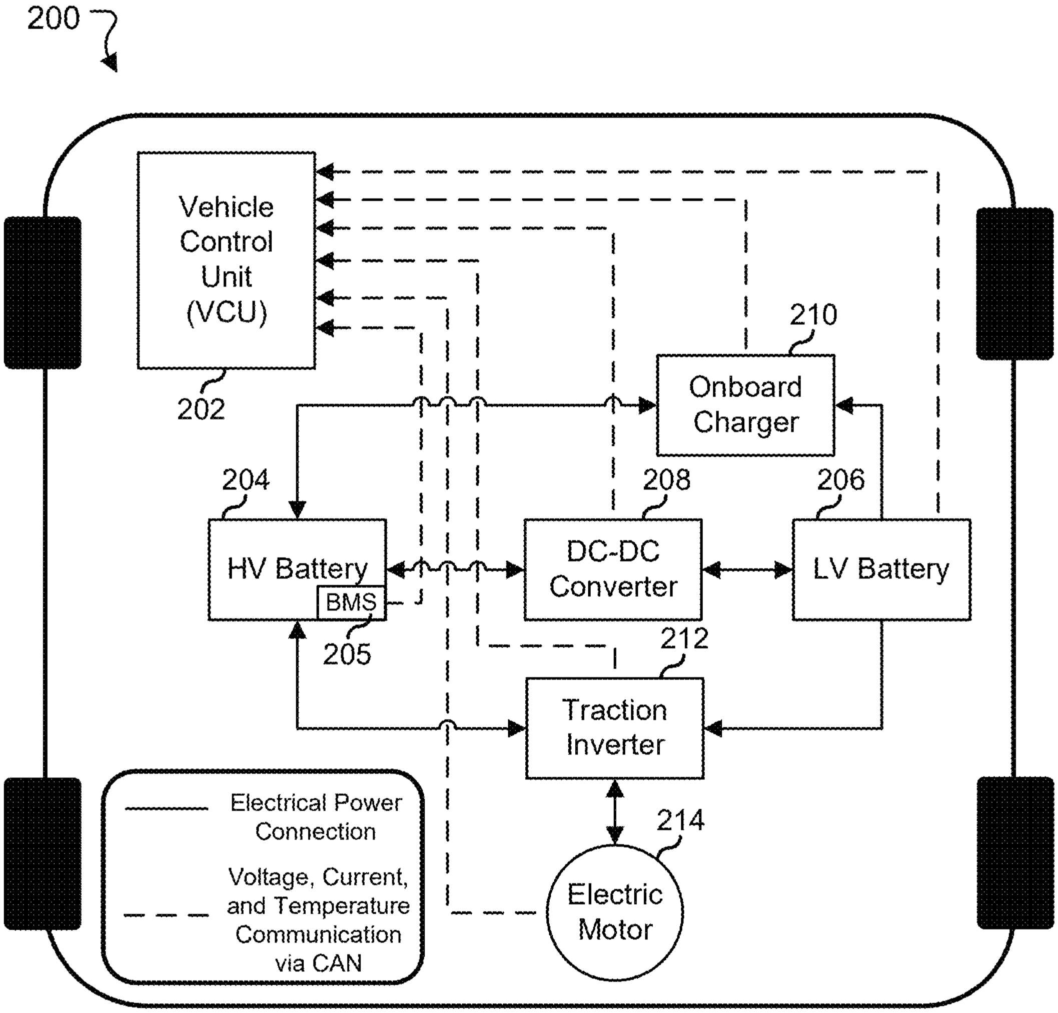
FIG. 2 illustrates an example EV powertrain architecture for a vehicle with which real time life-time monitoring for electric vehicle powertrains can be implemented in accordance with this disclosure.

In the present disclosure, the vehicle 100 can include various internal components related to electric vehicle battery, charging, power, and electric motor aspects of the vehicle 100 and connected to a vehicle control unit. For example, FIG. 2 illustrates an example EV powertrain architecture 200 for a vehicle with which real time life-time monitoring for electric vehicle powertrains can be implemented in accordance with this disclosure. The example EV powertrain architecture 200 illustrated in FIG. 2 is for illustration and explanation only. FIG. 2 does not limit the scope of this disclosure to any particular implementation of an electric vehicle powertrain.

In FIG. 2, the solid lines show the power connections between components while the dashed lines show signal and/or controller area network (CAN) communication connections between components and a vehicle control unit (VCU) 202. As shown in FIG. 2, the example EV powertrain architecture 200 includes a high-voltage (HV) battery 204, which can include a battery management system (BMS) 205, a low-voltage (LV) battery 206, a direct current to direct current (DC-DC) converter 208 connected between the HV battery 204 and the LV battery 206, an onboard charger 210 connected to each of the HV battery 204 and the LV battery 206, a traction inverter 212 connected to each of the HV battery 204 and the LV battery 206, and at least one electric motor 214 connected to the traction inverter 212.

The onboard charger 210 is configured to charge the HV battery 204, such as when the vehicle 100 is connected to a power supply, such as a level 1 or a level 2 charging source. The DC-DC converter 208 is configured to convert DC of the HV battery 204 and the LV battery 206 to lower or higher voltage levels according to the voltage levels used by each of the HV battery 204 and the LV battery 206. The traction inverter 212 is configured to convert a DC supply from the HV battery 204 and/or the LV battery 206 into an alternating current (AC) output for use by the electric motor 214. The traction inverter 212 can also be configured to convert an AC input from the electric motor 214 into a DC output to provide power to the HV battery 204 and/or the LV battery 206, such as during regenerative braking.

As also shown in FIG. 2, each of the components 204, 206, 208, 210, 212, and 214 of the EV powertrain architecture 200 is communicatively connected to the VCU 202 via at least one communication interface. The various communication connections between the components can be wireless or wired. For example, components 204, 206, 208, 210, 212, and 214 of the EV powertrain architecture 200 can be communicatively interconnected with the VCU 202 on a CAN via the so-called CAN bus.

Figure 3:
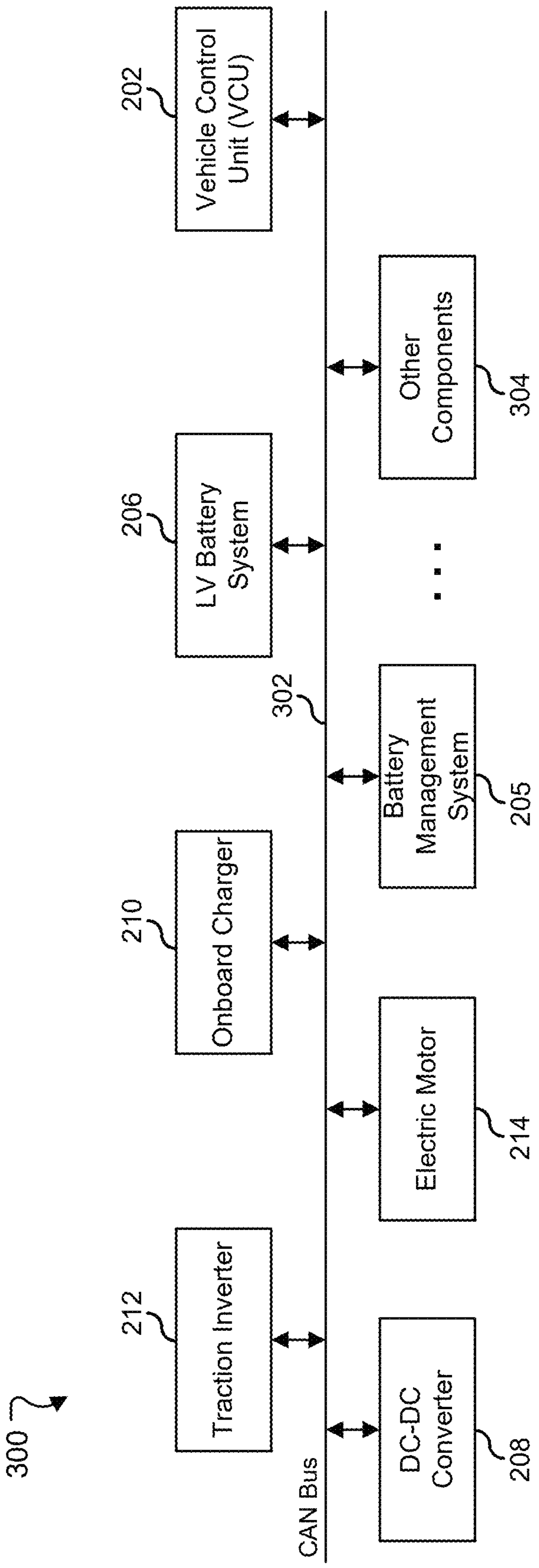
FIG. 3 illustrates an example CAN bus connection diagram in accordance with this disclosure.

For instance, FIG. 3 illustrates an example CAN bus connection diagram 300 in accordance with this disclosure. The example CAN bus connection diagram 300 illustrated in FIG. 3 is for illustration and explanation only. FIG. 3 does not limit the scope of this disclosure to any particular implementation of CAN bus connections between vehicle components. As shown in FIG. 3, each of the VCU 202, the HV battery 204 (e.g., via the BMS 205), the LV battery 206 (e.g., via an associated LV battery system), the DC-DC converter 208, the onboard charger 210, the traction inverter 212, the electric motor(s) 214, as well as any other components 304, are connected to a CAN bus 302.

It will be understood that each of the vehicle components 202-214 can utilize electronic control units (ECUs) to interconnect with the CAN bus and provide information to other components, and their respective ECUs, on the CAN bus. Each ECU can include a printed circuit board (PCB) with a processor or microcontroller integrated circuit coupled to various input sensors, switches, relays, and other output devices. The standard for the CAN bus was released around 1993 by the International Organization for Standardization (ISO) as ISO 11898. The current version of that standard is ISO 11898-1:2015, and the CAN busses described herein may comply with that standard in some embodiments. In various embodiments, the CAN design permits the components of the EV powertrain architecture 200 to communicate with each other without the need for a centralized host. Instead, communication can take place on a peer-to-peer basis. The CAN design therefore permits data from vehicle components such as those shown in FIGS. 2 and 3 to circulate between components, allowing each component to transmitting data on the CAN bus while simultaneously listening to the CAN bus to pull out data needed to complete tasks.

The EV powertrain architecture 200 can use the real-time life-time monitoring of this disclosure to monitor the health of the EV powertrain components and determine the required maintenance before failures occur. The voltage, current, and/or temperature information for each component 204, 206, 208, 210, 212, 214 (as well as any other vehicle components known or used in the future) is transferred to the VCU 202 via the CAN. In various embodiments, the VCU 202 is configured to store the raw data from the powertrain components in a memory, such as an electrically erasable programmable read-only memory (EEPROM). As further described in this disclosure, using the raw data, the VCU 202 is configured to calculate component level failure rates as well as module level failure rates using the available micro-processor of the VCU 202. The module level failure rates can then be translated into mean time to failure (MTTF) of that module based on a reliability definition.

Figure 4:
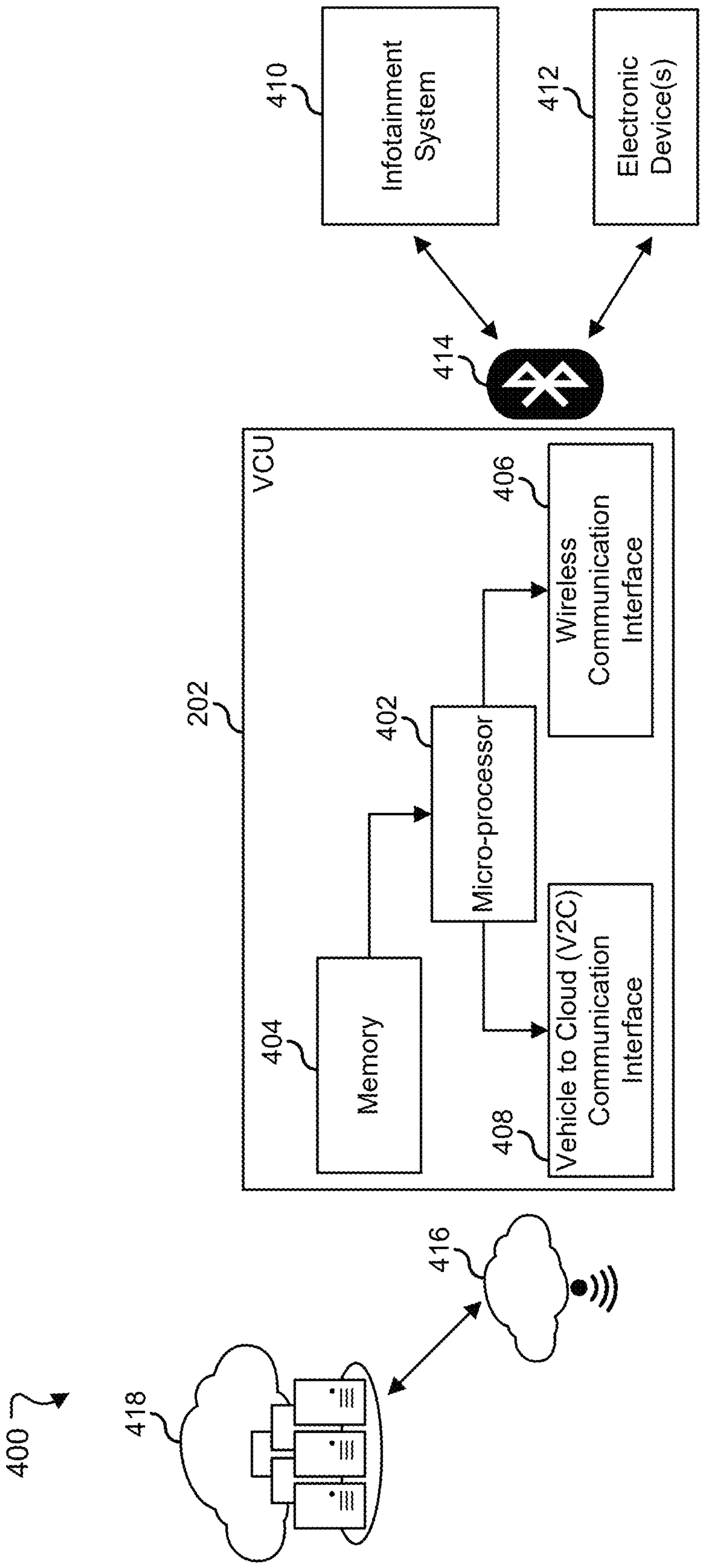
FIG. 4 illustrates an example vehicle communication system with which real time life-time monitoring can be implemented in accordance with this disclosure.

The MTTF is a direct measure of component/module life-time. The calculated life-time and failure rate information can not only be used for proactive maintenance, but also can be used for diagnostics run by dealerships (e.g., service shops) when failures occur. For instance, FIG. 4 illustrates an example vehicle communication system 400 with which real time life-time monitoring can be implemented in accordance with this disclosure. The example vehicle communication system 400 illustrated in FIG. 4 is for illustration and explanation only. FIG. 4 does not limit the scope of this disclosure to any particular implementation of a vehicle communication system.

As shown in FIG. 4, the VCU 202 can include at least one micro-processor 402, a memory 404, such as vehicle VCU memory like EEPROM, a wireless communication interface 406, such as a BLUETOOTH communication interface, and a vehicle to cloud (V2C) communication interface 408, such as a cellular network communication interface. As shown in FIG. 4, in various embodiments of this disclosure, the calculated life-time and failure rate information can be made available to the driver through a screen of the vehicle's infotainment system 410 and/or via a mobile application on a driver's electronic device 412, e.g., a smartphone, via a wireless connection 414, like a BLUETOOTH connection, provided via the wireless communication interface 406. This allows the driver to view a real-time health monitoring of the vehicle.

As also shown in FIG. 4, in various embodiments of this disclosure, the calculated life-time information can also be transmitted over a network 416, such as a cellular network and/or one or more other communication networks, to a cloud server system 418 via the V2C communication interface 408. This information can then be used by entities such as the manufacturer of the vehicle 100 to take various steps to improve vehicle reliability, such as by providing vehicle software updates (e.g., via over the air (OTA) updates or updates installed manually by service shops) affecting the components of the vehicle based on the received life-time information. It will be understood that the wireless communication interface 406 and/or the V2C communication interface 408 can be part of the VCU 202, or can be communicatively connected to the VCU 202. As described in this disclosure, in various embodiments, the vehicle 100, such as through the VCU 202, can perform various remedial measures based on the calculated life-time information to preserve component life-time and length the time to failure for specific vehicle components.

Although FIGS. 2-4 illustrate examples of an EV powertrain architecture 200, an example CAN bus connection diagram 300, and an example vehicle communication system 400, those skilled in the art will recognize that the full structure and operation of suitable vehicle systems and architectures are not depicted in the drawings or described here. Instead, for simplicity and clarity, only the structure and operation necessary for an understanding the present disclosure is depicted and described. Various changes may be made to the examples shown in FIGS. 2-4, and the real time life-time monitoring described in this disclosure may be used with any other suitable systems and architectures.

Figure 5:
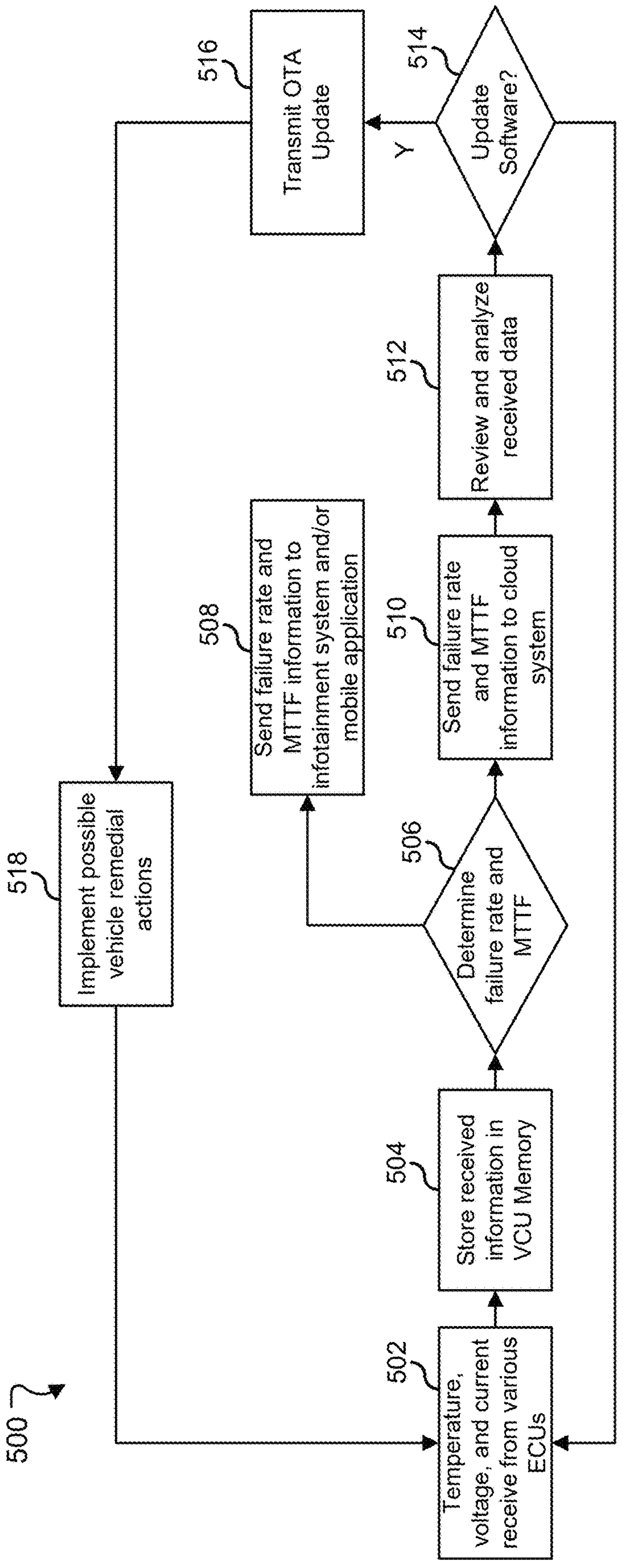
FIG. 5 illustrates an example method for real time life-time monitoring of a vehicle in accordance with this disclosure.

FIG. 5 illustrates an example method 500 for real time life-time monitoring of a vehicle in accordance with this disclosure. For ease of explanation, the method 500 shown in FIG. 5 is described as being performed using one or more of the vehicle 100, the architecture 200, and/or the vehicle communication system 400. In various embodiments, certain steps of the method 500 may be described as being performed by a processing device or processor, such as the VCU 202 and/or the micro-processor 402 of the VCU 202. However, the method 500 could be performed using any other suitable device(s) and in any other suitable system(s).

As shown in FIG. 5, at step 502, various data such as temperature, voltage, and current of vehicle components, such as the components 204-214 shown in FIGS. 2 and 3, provide from the vehicle components and are received by the VCU of the vehicle, such as the VCU 202. For example, the respective ECUs of the vehicle components can provide the data to the VCU of the vehicle via the VCU's ECU. At step 504, the data received by the VCU is stored in memory, such as in VCU memory (e.g., memory 404) like EEPROM.

At step 506, the VCU 202 determines a failure rate and MTTF for one or more vehicle components, such as one or more of the vehicle components 204-214. For example, the reliability of HV electronic systems/components such as the BMS 205, the DC-DC converter 208, the onboard charger 210, or the traction inverter 212 can be expressed as follows:

$$R(t)=e^{-\lambda t} \tag{1}$$

Here, λ is the failure rate and has a constant value based on each operating point.

The mathematical mean of R(t) occurs at t, shown as follows.

$$t=\frac{1}{\lambda} \tag{2}$$

Here, t is the amount of time that should elapse until the first failure occurs. This is the mean time to failure (MTTF).

A mean time between failure (MTBF) is defined as the sum of the MTTF plus a mean time to repair (MTTR), which can be represented as follows.

$$MTBF = MTTF + MTTR = \frac{1}{\lambda} \tag{3}$$

Since MTTR is typically negligible as compared with MTTF, then MTTF=MTBF. MTTF is a direct measure for the health of the system. In equation (3), λ represents the total failure rate of the system.

Total failure rate of a system, shown as denoted $\lambda_{System}$, can be calculated based on a part stress calculation, which can be represented as follows.

$$\lambda_{System} = \sum_{i=1}^{N} (\lambda_{Part})_i \tag{4}$$

Here, $\lambda_{Part}$ represents the failure rate of each component, and i represents i-th part in a system with N parts.

The failure rate of each component is a function of multiple stress factors including voltage, current, and temperature. The military handbook for reliability analysis (MIL-HDBK-217) can be used as a reference for failure rate equations. An example of a failure rate equation for a semiconductor switch can be as follows.

$$\lambda_{P(S)} = \lambda_{b(S)} \times \pi_Q \times \pi_A \times \pi_E \times \pi_T \tag{5}$$

Here, $\lambda_{b(S)}$ is the base failure rate of a switch and the π factors are dependent on the operating condition and vary based on operating voltage, current, and temperature. Therefore, each unique operating point results in a unique failure rate.

The information regarding operating voltage, current, and temperature, most of which is already available to the VCU via step 502, is thus used by the VCU to perform the life-time calculations and report the overall system failure rate and MTTF.

At step 508, the calculated failure rate and MTTF information is sent, such as via the wireless communication interface 406, to the vehicle infotainment system, such as infotainment system 410, and/or to a mobile application, such as a mobile application of electronic device 412. This allows for the failure rate and MTTF information to be displayed on a screen of the infotainment system 410 and/or the screen of the electronic device executing the mobile application, to allow the user/driver to view the failure rate and MTTF information to inform the user/driver of the state of the vehicle.

At step 510, the calculated failure rate and MTTF information is sent, such as via the V2C communication interface 408, to a cloud system such as the cloud server system 418. This allows for the failure rate and MTTF information to be used to tailor vehicle operating parameters based on the calculated failure rate and MTTF information. For example, at step 512, the data received on the calculated failure rate and MTTF information can be reviewed and analyzed to determine which vehicle components may need to have operating parameters of the vehicle altered to maximize the life of the vehicle components and increase the life-time of the component before the component fails. Such operating parameters can include reducing the charging power provided, for example, to the HV battery to reduce strain on the HV battery.

For instance, during level 3 DC fast charging, the operating parameters could be changed to limit the charging power allowed during level 3 DC fast charging to levels below the original offered by the vehicle, such as reducing maximum allowed charging power from 150 kW to 100 kW. As another example, the operating parameter changes can include parameters for increasing fan speed or changing fan speed temperatures thresholds so that vehicle fans speeds can increase for different detected temperatures thresholds that may be different than originally set for the vehicle when newly manufactured. As yet another example, based on calculated failure rate and MTTF information for the vehicle electric motors, parameters can be set to only run one of the electric motors either indefinitely, or based on certain parameters like a set time period or based on driving behavior.

At step 514, it is determined whether to provide a software update to the vehicle. This can be based on the received failure rate and MTTF information. For example, if the failure rate and MTTF information is not substantially changed since the last time the failure rate and MTTF information was reported for the vehicle, then it may be determined that no software update should be provided and the method 500 can end. However, if it is determined that the received failure rate and MTTF information warrant a software update to alter the vehicle operating parameters, then, at step 516, an OTA update is transmitted to the vehicle. Based on the provided software update, at step 518, the vehicle can implement the vehicle remedial actions based on the operating conditions of the vehicle. The method 500 can then loop back to step 502 to continually, or periodically, measure the various vehicle components, determine failure rates and MTTF information for various vehicle components, and transmit the failure rates and MTTF information for further display to the driver or further analysis and possible software updates. Other parameter changes are further described with respect to FIGS. 6 and 7.

The real time life-time monitoring of the various systems and methods of this disclosure thus provides various benefits including that a driver can take proactive actions to do required vehicle maintenance before a vehicle's powertrain components fail, reduced warranty costs to automakers by understanding the weak points in the system and taking proper action to fix them prior to failures, and reducing required time to root cause the problem and service the vehicle at dealerships once the vehicle fails, which saves cost and reduces vehicle down time, as well as improves customer satisfaction. The real time life-time monitoring of the various systems and methods of this disclosure also provides various other benefits including that in high volume, the real-time failure rate and life information, available to the automakers through the cloud, assists automakers with providing proper OTA updates and prevents major vehicle failures and recalls, the real-time failure rate and life information can be made available to the driver via app on the phone, so that the driver has live access to his vehicle's health condition, and there could be significant advantage in military applications where knowing the remained life-time and failure rate of vehicles could save lives.

Although previous work has been done towards determining failure rates and the estimated life-times for electronic components, these were based on static values and fixed operating points. One such previous work is Abdi, et al., "Reliability Considerations for Parallel Performance of Semiconductor Switches in High-Power Switching Power Supplies," IEEE Transactions on Industrial Electronics, Vol. 56, No. 6, June 2009, which is incorporated by reference herein. This, however, is not the case in EV applications where the failure rates and the expected life-time will be dynamic, depending on the driver's driving habits as well as environmental conditions.

Previous approaches also did not provide the live information to a user, whereas the estimated failure rate and life-time information of this disclosure are updated in real-time based on the instantaneous operating conditions and then reported to the driver on the infotainment screen. This way, the driver will have live access to the health of the vehicle and its subsystems and can take proactive actions for vehicle maintenance to prevent failures and vehicle down time. The real-time failure rate values and remaining life-time information is also stored in the VCU memory. This way, not only the VCU can take proactive actions to prevent vehicle failures, but also the information stored in the VCU memory can be retrieved by the service dealership to quickly and accurately root cause the failure. This will significantly reduce the vehicle service time and associated costs. In various embodiments, the data gathering and calculations are fully integrated with the EV powertrain system, and, therefore, no external calculations and/or measurements may be needed for failure detections and/or lifetime estimations.

Although FIG. 5 illustrates one example of a method 500 for real time life-time monitoring of a vehicle, various changes may be made to FIG. 5. For example, while shown as a series of steps, various steps in FIG. 5 could overlap, occur in parallel, occur in a different order, or occur any number of times (including zero times). For example, in some embodiments, the method 500 can include transmitting information at step 510 to the cloud server, without also sending the information to the infotainment system of the vehicle, that is, the method may not perform step 508. In some embodiments, only data on certain components, such as the HV battery, may be provided to the infotainment system, while information on other components, such as the DC-DC converter, may not be provided to the infotainment system, but only to the cloud server(s). As another example, step 516 could include, instead of providing an OTA update, manually updating the software of the vehicle, such as by a technician at a service center.

Figure 6:
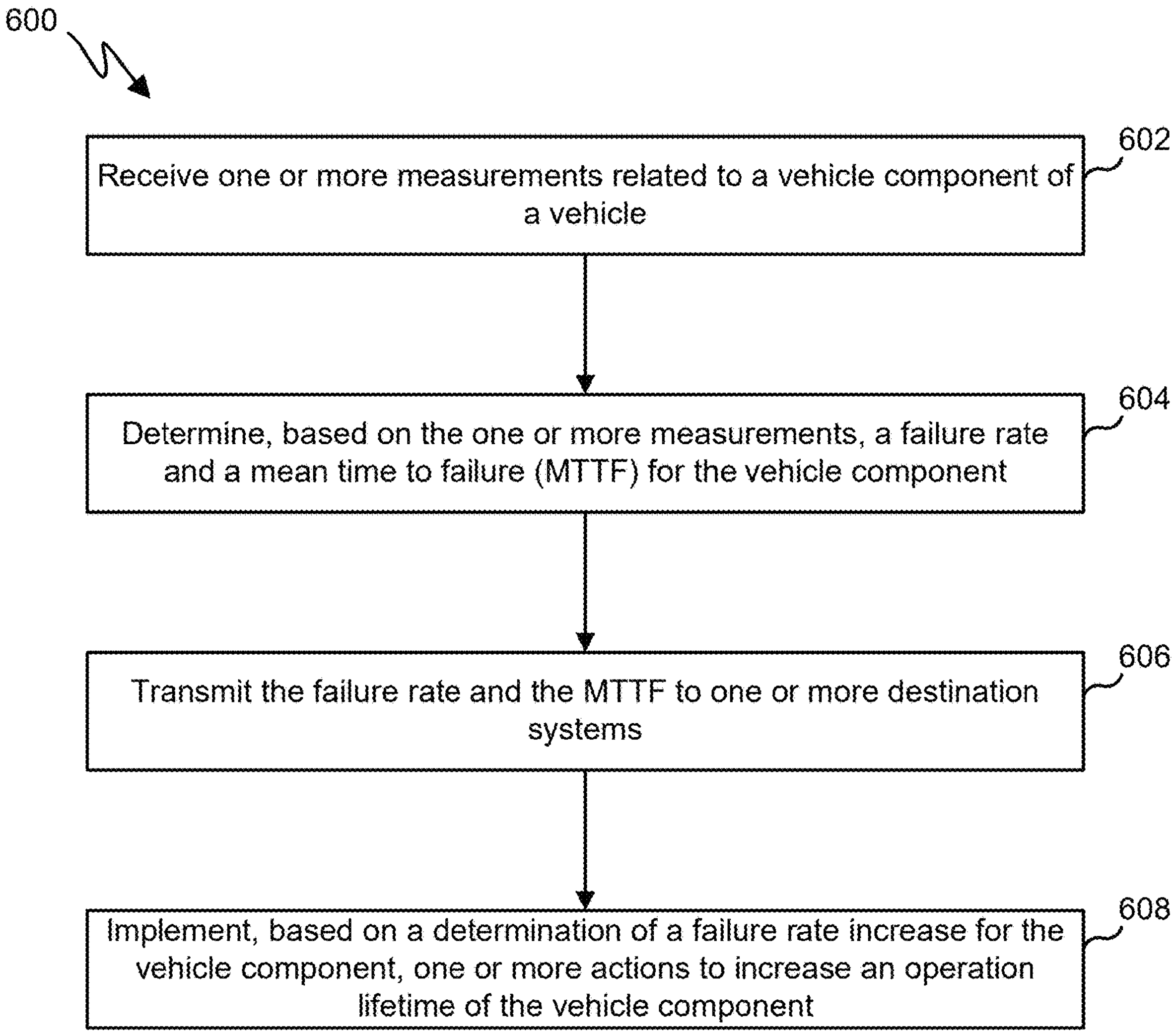
FIG. 6 illustrates another example method for real time life-time monitoring of a vehicle in accordance with this disclosure.

FIG. 6 illustrates another example method 600 for real time life-time monitoring of a vehicle in accordance with this disclosure. For ease of explanation, the method 600 shown in FIG. 6 is described as being performed using one or more of the vehicle 100, the architecture 200, and/or the vehicle communication system 400. In various embodiments, certain steps of the method 600 may be described as being performed by a processing device or processor, such as the VCU 202 and/or the micro-processor 402 of the VCU 202. However, the method 600 could be performed using any other suitable device(s) and in any other suitable system (s).

At step 602, one or more measurements related to a vehicle component of a vehicle are received. This can include a processing device of the vehicle receiving the one or more measurements over a communication medium such as a CAN bus. As described in this disclosure, the vehicle component can be the HV battery 204, the LV battery 206, the DC-DC converter 208, the onboard charger 210, the traction inverter 212, one or more electric motors 214, or any other vehicle component. As described in this disclosure, the one or more measurements may include a temperature of the vehicle component, a voltage of the vehicle component, and/or an electrical current of the vehicle component. At step 604, a failure rate and an MTTF are determined for the vehicle component. This can include the processing device performing one or more calculations using the one or more measurements, as described in this disclosure. It will be understood that multiple vehicle components can be monitored and, in such cases, the method 600 can include determining, by the processing device, a failure rate and an MTTF for each of a plurality of vehicle components and calculating, by the processing device, a total failure rate associated with the vehicle based on the failure rate and the MTTF determined for each of the vehicle components.

At step 606, the failure rate and the MTTF are transmitted to one or more destination systems. For example, step 606 can include the processing device transmitting, using a communication interface such as the wireless communication interface 406, the failure rate and the MTTF to an infotainment system of the vehicle and/or a client electronic device, and wherein information associated with the failure rate and the MTTF is displayed on a screen of the infotainment system and/or the client electronic device. As another example, the one or more destination systems can include a cloud system, such as the cloud server system 418, remote from the vehicle, and the processing device transmits the failure rate and the MTTF to the cloud system. In such embodiments, the method 600 can further include receiving, by the processing device using the communication interface, a software update transmitted from the cloud system, the software update including changes to one or more operating parameters of the vehicle related to the one or more actions to increase the operation lifetime of the vehicle component.

At step 608, one or more actions to increase an operation lifetime of the vehicle component are implemented. This can include the processing device, based on a determination of a failure rate increase for the vehicle component, altering one or more operating conditions or parameters for one or more of the vehicle components, as described in this disclosure.

Although FIG. 6 illustrates one example of a method 600 for real time life-time monitoring of a vehicle, various changes may be made to FIG. 6. For example, while shown as a series of steps, various steps in FIG. 6 could overlap, occur in parallel, occur in a different order, or occur any number of times (including zero times).

Figure 7:
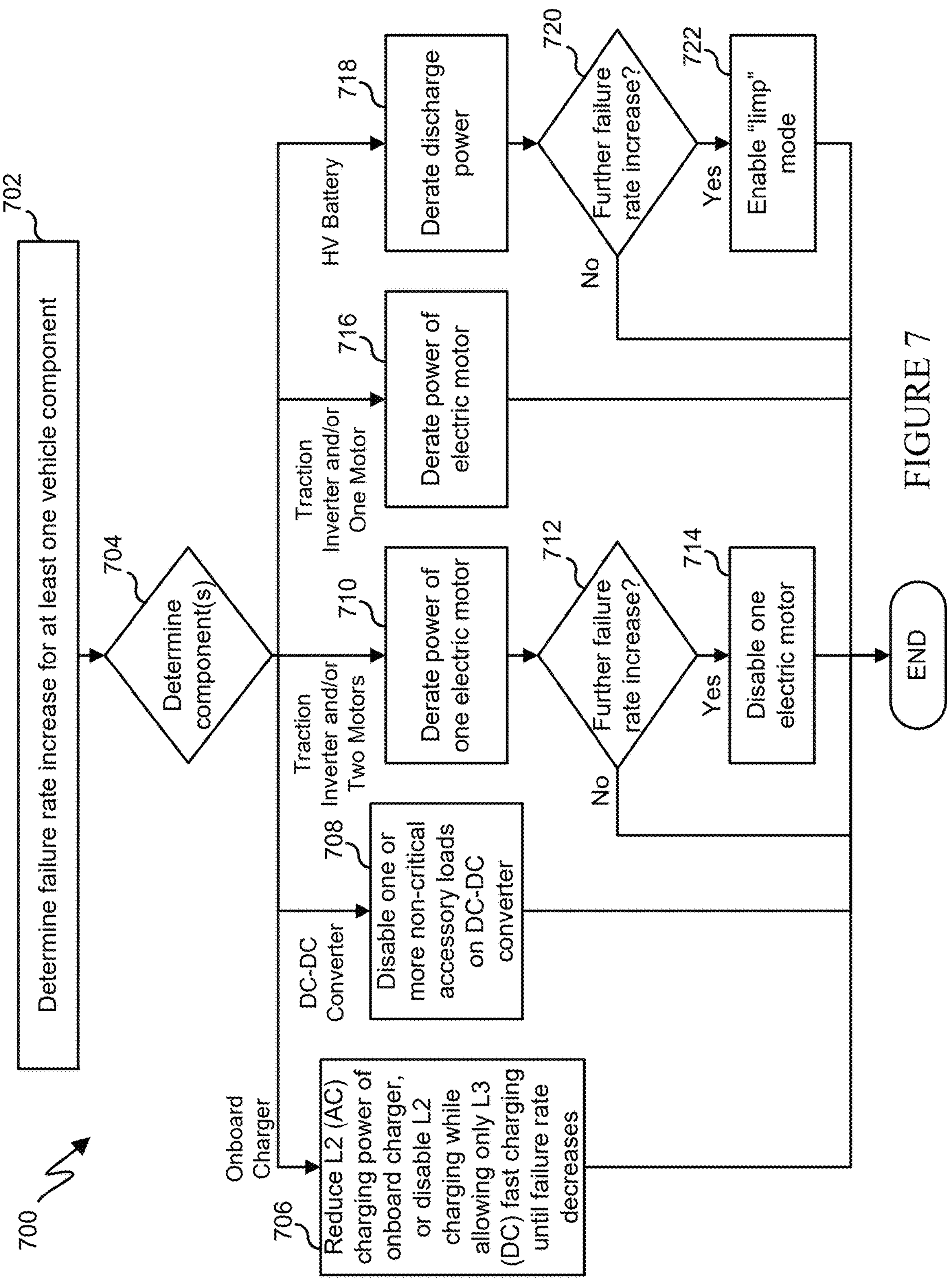
FIG. 7 illustrates an example method for updating operational parameters of vehicle components in accordance with this disclosure.

FIG. 7 illustrates an example method 700 for updating operational parameters of vehicle components in accordance with this disclosure. For ease of explanation, the method 700 shown in FIG. 7 is described as being performed using one or more of the vehicle 100, the architecture 200, and/or the vehicle communication system 400. In various embodiments, certain steps of the method 700 may be described as being performed by a processing device or processor, such as the VCU 202 and/or the micro-processor 402 of the VCU 202. However, the method 700 could be performed using any other suitable device(s) and in any other suitable system (s).

It will be understood that the method 700 could be combined with the method 600. For example, the method 700 can be part of step 608 of the method 600 in which the processing device implements one or more actions to increase an operation lifetime of one or more vehicle components. As described in this disclosure, the vehicle component can be the HV battery 204, the LV battery 206, the DC-DC converter 208, the onboard charger 210, the traction inverter 212, one or more electric motors 214, or any other vehicle component.

At step 702, a failure rate increase for at least one vehicle component is determined. This can include the processing device calculating a new failure rate for the at least one vehicle component and that the failure rate is an increase over previous failure rate. In some embodiments, the increase can be compared to a threshold increase to determine if the other steps in the method 700 should be performed or if the operational parameters of the vehicle should not be changed when the increase is below the threshold. In some embodiments, as described in this disclosure, the failure rate increase is determined remotely, such as by an automobile manufacturer, and instructions are transmitting to the processing device to implement operational changes to the vehicle, such as via an OTA software update.

At step 704, it is determined for which vehicle components the failure rate increase is associated. In some embodiments, one vehicle component could be identified as having a failure rate increase, and operational parameters for that vehicle component are adjusted, or multiple vehicle components could be identified and each of their operation parameters can be adjusted. As shown in FIG. 7, various operational parameters can be altered based on the determined failure rate increase.

For example, at step 706, if it is determined a failure rate increase is associated with the onboard charger of the vehicle, in some embodiments, a level 2 (L2) alternating current (AC) charging power of the onboard charger is reduced. The reduction in power can be in effect until the vehicle is taken in for repairs. Alternatively, at step 706, L2 AC charging can be disabled (such as based on a determination that the failure rate increase is severe or over a threshold) while allowing only level 3 (L3) DC fast charging (which bypasses the onboard charger) until the failure rate decreases and the expected lifetime increases (which could involve the onboard charger being repaired or replaced).

At step 708, if it is determined a failure rate increase is associated with the DC-DC converter of the vehicle, in some embodiments, at least one non-critical accessory load on the DC-DC converter is disabled. For example, non-critical accessories such as the vehicle music radio, seat adjustment motor, and/or other non-critical electrical components could be disabled, in order to increase the estimated lifetime of the DC-DC converter.

At step 710, if the vehicle includes two electric motors and it is determined a failure rate increase is associated with one of the electric motors and/or the traction converter, the power of one of the electric motors can be derated. For example, one motor could be derated to take load off the traction converter, or, as another example, if just one of the motors is associated with the failure rate increase, the power for that one electric motor can be derated. In some embodiments, power can be increased to the other electric motor not associated with the failure rate increase. At step 712, if is determined if the electric motor or traction converter experiences, at a later time, a further failure rate increase. If so, in some embodiments, one of the electric motors can be disabling such that the vehicle operates using just one of the electric motors, either indefinitely or until issues with the disabled electric motor are resolved or repaired. Alternatively, at step 716, if the vehicle includes just one electric motor and it is determined a failure rate increase is associated with the electric motor and/or the traction converter, the power of the electric motor can be derated.

At step 718, if it is determined a failure rate increase is associated with the HV battery of the vehicle, in some embodiments, discharge power of the HV battery can be derated. At step 720, if is determined if the HV battery experiences, at a later time, a further failure rate increase. If so, at step 722, the vehicle can be put into a "limp" mode in which power is significantly reduced and speed of the vehicle limited, so that the vehicle can be safely operated to a service center. In some embodiments, the vehicle could be put into the "limp" mode instead of performing step 718, depending on the actual value for the estimated failure rate and lifetime estimation. For example, if the failure rate increase is above a threshold, steps 718 and 720 may be skipped and step 722 performed immediately after step 704.

It will be understood that the actions taken in the method 700 may only persist until the vehicle is properly serviced. When the vehicle goes to the shop for service, the information on the failure rates and the lifetime can be retrieved, reducing the amount of time spent on diagnostics, and allowing for issues to potentially be addressed and actions or limit on certain vehicle components to be lifted.

Although FIG. 7 illustrates one example of a method 700 for updating operational parameters of vehicle components, various changes may be made to FIG. 7. For example, while shown as a series of steps, various steps in FIG. 7 could overlap, occur in parallel, occur in a different order, or occur any number of times (including zero times).

Many functional aspects of the present invention can be embodied as software instructions running on a unitary or multi-core central processing unit. Alternatively, functional aspects can manifest as Application Specific Integrated Circuits (ASICs). The ASIC manifestation may use integrated circuit design and manufacturing techniques commonly automated with Electronic Design Automation (EDA) tools. Exemplary but not exclusive tools may be found from companies such as, but not limited to, Synopsys, Cadence, and Mentor Graphics. The details of these EDA tools are not required for the present disclosure.

Figure 8:
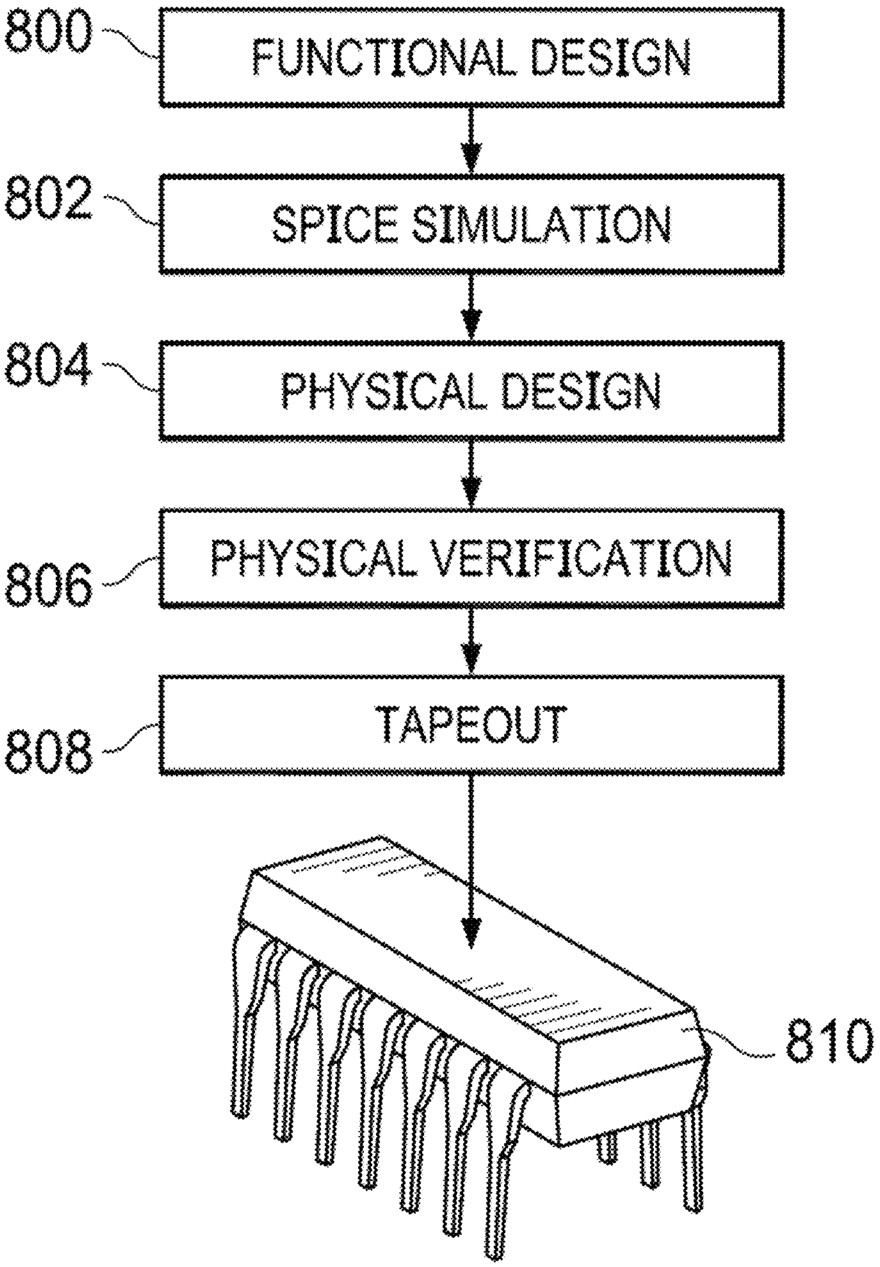
FIG. 8 illustrates a simplified general ASIC design flow employing tools for producing ASICs in accordance with embodiments of the present disclosure.

Reference is now made to FIG. 8 illustrating a simplified general ASIC design flow employing (EDA) tools for producing ASICs having embodiments of the present disclosure. At step 800, the functional design of an ASIC, which may include at least a portion of the methods 500, 600, and/or 700, is created. For those portions of the ASIC digital in nature, the functional design is typically manifested by writing Register Transfer Level (RTL) code in a Hardware Descriptive Language (HDL) such as but not limited to, VHDL or Verilog. A functional verification (behavioral simulation) is then preferably performed on the HDL data structures to ensure the RTL design is in accordance with the logic specifications. Alternatively, a schematic of the digital logic can be captured with a schematic capture program.

For portions of the ASIC that are analog in nature, the analog functional design is typically manifested by capturing a schematic with a schematic capture program. The output of the schematic capture program is then converted (synthesized) into gate/transistor level netlist data structures.

At step 802, the data structures are simulated with a simulation program with integrated circuits emphasis (SPICE). At step 804, the data structures from step 802 are instantiated with their geometric representations and the physical layout of the ASIC is performed.

The first step in physical layout is typically so-called "floor-planning" wherein gross regions on the integrated circuit chip are assigned and input/output (I/O) pins are defined. Hard cores (e.g., arrays, analog blocks, inductors, etc.) are placed within the gross regions based on the design constraints (e.g., trace lengths, timing etc.). Clock wiring (commonly referred to as clock trees) are placed and connections between gates/analog blocks are routed. When all the elements are placed, a global and detailed routing is running to connect all the elements together. Post-wiring optimization is preferably performed to improve performance (timing closure), noise (signal integrity), and yield. The layout is modified, where possible, while maintaining compliance with the design rules set by the captive or external semiconductor manufacturing foundry of choice, to make it more efficient to produce. Such modifications may include adding extra vias or dummy metal/diffusion/poly layers.

At step 806, the physical design is verified. Design rule checking (DRC) is performed to determine whether the physical layout of the ASIC satisfies a series of recommended parameters, i.e., design rules of the foundry. The design rules are a series of parameters provided by the foundry that are specific to a particular semiconductor manufacturing process. The design rules specify certain geometric and connectivity restrictions to ensure sufficient margins to account for variability in semiconductor manufacturing processes, to ensure that the ASICs work correctly. A layout versus schematic (LVS) check is preferably performed to verify the physical layout corresponds to the original schematic or circuit diagram of the design. A complete simulation is then preferably performed to ensure the layout phase is properly done.

After the layout is verified in step 806, mask generation design data, typically in the form of graphic design system II (GDSII) data structures, is said to "tape-out" for preparation of photomasks at step 808. The GDSII data structures are transferred through a communications medium (e.g., storage or over a network) from the circuit designer to either a photomask supplier/maker or directly to the semiconductor foundry.

At step 810, the photomasks are created and used to manufacture ASICs in accordance with principles of the present disclosure.

Some of the techniques described herein can be implemented by software stored on one or more computer readable storage medium and executed on a computer. The selected techniques could be executed on a single computer or a computer networked with another computer or computers. For clarity, only those aspects of the tools or computer germane to the disclosed techniques are described. Product details well known in the art may be omitted.

Figure 9:
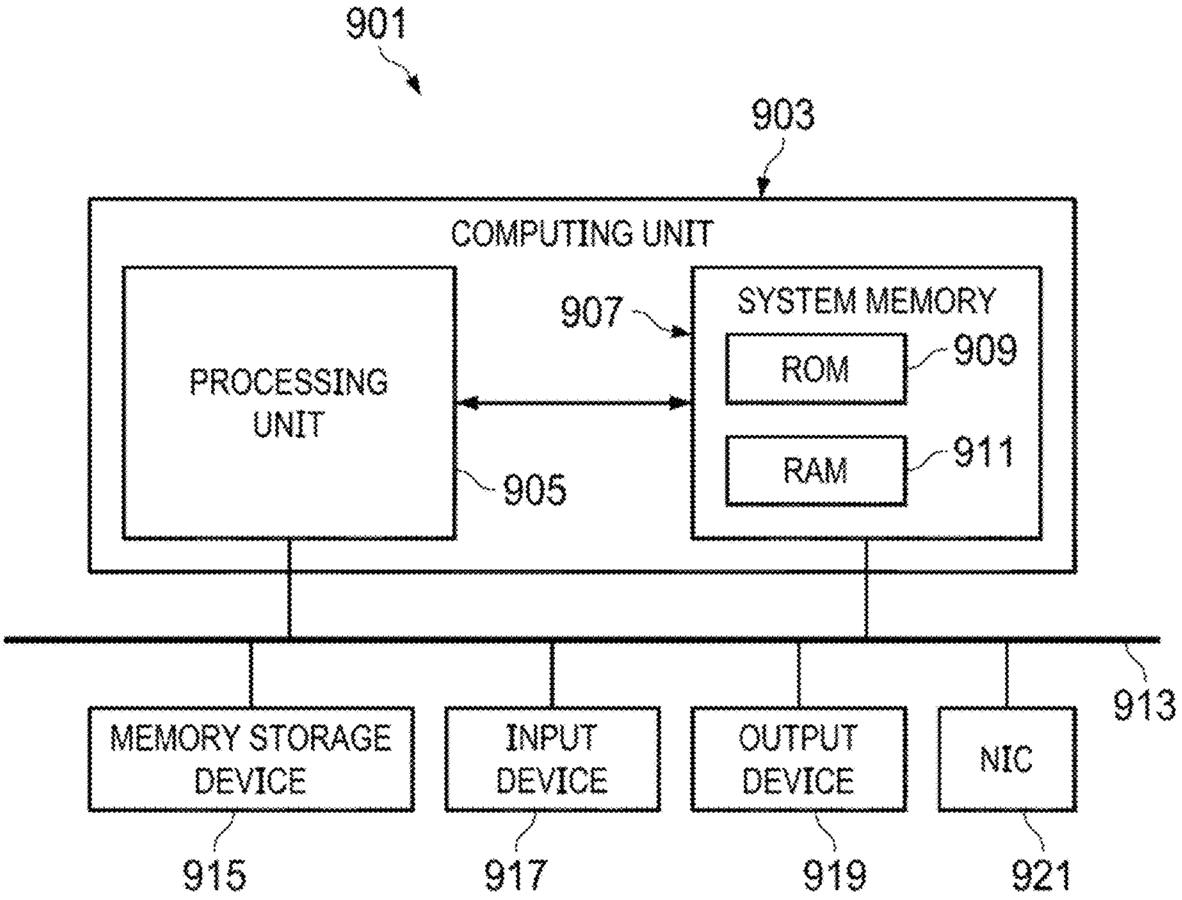
FIG. 9 illustrates an example computing device in accordance with embodiments of the present disclosure.

FIG. 9 illustrates an example computing device 901 for practicing the design flow of FIG. 8. As seen in FIG. 9, the computing device 901 includes a computing unit 903 with a processing unit 905 and a system memory 907. The processing unit 905 may be any type of programmable electronic device for executing software instructions, but will conventionally be a microprocessor. In some embodiments, the processing unit 905 can be the VCU 202 or the microprocessor 402. The system memory 907 may include both a read-only memory (ROM) 909 and a random access memory (RAM) 911, which can be the memory 404. As will be appreciated by those of ordinary skill in the art, both the read-only memory 909 and the random access memory 911 may store software instructions for execution by the processing unit 905.

The processing unit 905 and the system memory 907 are connected, either directly or indirectly, through a bus 913 or alternate communication structure, to one or more peripheral devices. For example, the processing unit 905 or the system memory 907 may be directly or indirectly connected to one or more additional memory storage devices 915. The memory storage devices 915 may include, for example, a "hard" magnetic disk drive, a solid state disk drive, an optical disk drive, and a removable disk drive. The processing unit 905 and the system memory 907 also may be directly or indirectly connected to one or more input devices 917 and one or more output devices 919. The input devices 917 may include, for example, a keyboard, a pointing device (such as a mouse, touchpad, stylus, trackball, or joystick), a scanner, a camera, touchscreen, and a microphone. The output devices 919 may include, for example, a display device, a printer, and speakers. With various examples of the computing device 901, one or more of the peripheral devices 915-919 may be internally housed with the computing unit 903. Alternately, one or more of the peripheral devices 915-919 may be external to the housing for the computing unit 903 and connected to the bus 913 through, for example, a Universal Serial Bus (USB) connection or a digital visual interface (DVI) connection.

With some implementations, the computing unit 903 may also be directly or indirectly connected to one or more network interfaces cards (NIC) 921, for communicating with other devices making up a network. The network interface cards 921 translate data and control signals from the computing unit 903 into network messages according to one or more communication protocols, such as the transmission control protocol (TCP) and the Internet protocol (IP). Also, the network interface cards 921 may employ any suitable connection agent (or combination of agents) for connecting to a network, including, for example, a wireless transceiver, a modem, or an Ethernet connection.

It should be appreciated that the computing device 901 is illustrated as an example only, and it not intended to be limiting. Various embodiments of the invention may be implemented using one or more computing devices that include the components of the computing device 901 illustrated in FIG. 9, or which include an alternate combination of components, including components that are not shown in FIG. 9. For example, various embodiments of the invention may be implemented using a multi-processor computer, a plurality of single and/or multiprocessor computers arranged into a network, or some combination of both.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
- receiving, by a processing device of a vehicle, one or more measurements related to a vehicle component of the vehicle;
- determining, by the processing device, based on the one or more measurements, a failure rate and a mean time to failure (MTTF) for the vehicle component;
- transmitting, by the processing device using a communication interface, the failure rate and the MTTF to one or more destination systems; and
- implementing, by the processing device based on a determination of a failure rate increase for the vehicle component, one or more actions to increase an operation lifetime of the vehicle component.

2. The method of claim 1, wherein the one or more measurements include one or more of:
- a temperature of the vehicle component;
- a voltage of the vehicle component; or
- an electrical current of the vehicle component.

3. The method of claim 1, further comprising:
- determining, by the processing device, a failure rate and an MTTF for each of a plurality of vehicle components; and
- calculating, by the processing device, a total failure rate associated with the vehicle based on the failure rate and the MTTF determined for each of the vehicle components.

4. The method of claim 1, wherein the one or more destination systems includes an infotainment system of the vehicle or a client electronic device, and wherein information associated with the failure rate and the MTTF is displayed on a screen of the infotainment system or the client electronic device.

5. The method of claim 1, wherein the one or more destination systems includes a cloud system remote from the vehicle, the method further comprising:
- receiving, by the processing device using the communication interface, a software update transmitted from the cloud system,
- wherein the software update includes changes to one or more operating parameters of the vehicle related to the one or more actions to increase the operation lifetime of the vehicle component.

6. The method of claim 1, wherein the vehicle component includes:
- a high-voltage battery and an associated battery management system (BMS);
- a low-voltage battery;
- a direct current (DC)-DC converter;
- an onboard charger;
- a traction inverter; or
- one or more electric motors.

7. The method of claim 6, wherein the vehicle component is the onboard charger, and wherein implementing, by the processing device based on the determination of the failure rate increase for the vehicle component, the one or more actions includes:
- reducing a maximum level 2 charging power of the onboard charger; or
- disabling level 2 charging and only allowing level 3 DC fast charging.

8. The method of claim 6, wherein the vehicle component is the one or more electric motors and the one or more electric motors includes only one electric motor, and
- wherein implementing, by the processing device based on the determination of the failure rate increase for the vehicle component, the one or more actions includes derating power to the one electric motor.

9. The method of claim 6, wherein the vehicle component is the one or more electric motors and the one or more electric motors includes a first electric motor and a second electric motor, and
- wherein implementing, by the processing device based on the determination of the failure rate increase for the vehicle component, the one or more actions includes, based on an amount of the failure rate increase:
  - determining that the first electric motor is associated with the failure rate increase; and
  - reducing power provided to the first electric motor and increasing power to the second electric motor, or disabling the first electric motor.

10. The method of claim 6, wherein the vehicle component is the DC-DC converter, and wherein implementing, by the processing device based on the determination of the failure rate increase for the vehicle component, the one or more actions includes disabling at least one non-critical accessory load on the DC-DC converter.

11. The method of claim 6, wherein the vehicle component is the high-voltage battery, and wherein implementing, by the processing device based on the determination of the failure rate increase for the vehicle component, the one or more actions includes, based on an amount of the failure rate increase:
- derating a discharge power of the high-voltage battery; or
- enabling a limp mode function of the vehicle.

12. An electric vehicle, comprising:
- a memory;
- a communication interface; and
- a processing device communicatively connected to the memory, the communication interface, and a vehicle component of the electric vehicle, wherein the processing device is configured to:
  - receive one or more measurements related to the vehicle component;
  - determine, based on the one or more measurements, a failure rate and a mean time to failure (MTTF) for the vehicle component;
  - transmit, using the communication interface, the failure rate and the MTTF to one or more destination systems; and
  - implement, based on a determination of a failure rate increase for the vehicle component, one or more actions to increase an operation lifetime of the vehicle component.

13. The electric vehicle of claim 12, wherein the one or more measurements include one or more of:
- a temperature of the vehicle component;
- a voltage of the vehicle component; or
- an electrical current of the vehicle component.

14. The electric vehicle of claim 12, wherein the processing device is configured to:

determine a failure rate and an MTTF for each of a plurality of vehicle components; and calculate a total failure rate associated with the electric vehicle based on the failure rate and the MTTF determined for each of the vehicle components.

15. The electric vehicle of claim 12, wherein the one or more destination systems includes an infotainment system of the electric vehicle or a client electronic device, and wherein information associated with the failure rate and the MTTF is displayed on a screen of the infotainment system or the client electronic device.

16. The electric vehicle of claim 12, wherein the one or more destination systems includes a cloud system remote from the electric vehicle, wherein the processing device is configured to:

receive, using the communication interface, a software update transmitted from the cloud system, wherein the software update includes changes to one or more operating parameters of the electric vehicle related to the one or more actions to increase the operation lifetime of the vehicle component.

17. The electric vehicle of claim 12, wherein the vehicle component includes:

a high-voltage battery and an associated battery management system (BMS);

a low-voltage battery;

a direct current (DC)-DC converter;

an onboard charger;

a traction inverter; or one or more electric motors.

18. The electric vehicle of claim 17, wherein the vehicle component is the onboard charger, and wherein, to implement, based on the determination of the failure rate increase for the vehicle component, the one or more actions, the processing device is configured to:

reduce a maximum level 2 charging power of the onboard charger; or disable level 2 charging and only allow level 3 DC fast charging.

19. The electric vehicle of claim 17, wherein the vehicle component is the one or more electric motors and the one or more electric motors includes only one electric motor, and wherein, to implement, based on the determination of the failure rate increase for the vehicle component, the one or more actions, the processing device is configured to derate power to the one electric motor.

20. The electric vehicle of claim 17, wherein the vehicle component is the one or more electric motors and the one or more electric motors includes a first electric motor and a second electric motor, and wherein, to implement, based on the determination of the failure rate increase for the vehicle component, the one or more actions, the processing device is configured to, based on an amount of the failure rate increase:

determine that the first electric motor is associated with the failure rate increase; and reduce power provided to the first electric motor and increase power to the second electric motor, or disable the first electric motor.

21. The electric vehicle of claim 17, wherein the vehicle component is the DC-DC converter, and wherein, to implement, based on the determination of the failure rate increase for the vehicle component, the one or more actions, the processing device is configured to disable at least one non-critical accessory load on the DC-DC converter.

22. The electric vehicle of claim 17, wherein the vehicle component is the high-voltage battery, and wherein, to implement, based on the determination of the failure rate increase for the vehicle component, the one or more actions, the processing device is configured to, based on an amount of the failure rate increase:

derate a discharge power of the high-voltage battery; or enable a limp mode function of the electric vehicle.

* * * * *